(12) United States Patent
Gwinn

(10) Patent No.: US 6,224,047 B1
(45) Date of Patent: May 1, 2001

(54) ELASTOMERIC BEARING

(75) Inventor: James T. Gwinn, Fairview, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/141,905

(22) Filed: Aug. 28, 1998

(51) Int. Cl.⁷ .................................................. B60G 11/14
(52) U.S. Cl. ........................... 267/292; 267/141; 267/293
(58) Field of Search ..................... 267/292, 293, 267/140.4, 141.3, 141.1, 141.7, 282, 279, 280, 281, 141, 276, 141.4, 141.2, 140.3; 384/423, 595, 599, 296, 265, 125, 295, 596, 597; 29/895.32, 985.3

(56) References Cited

U.S. PATENT DOCUMENTS

| | | | |
|---|---|---|---|
| 2,210,097 | * 8/1940 | Piron ..................................... | 248/635 |
| 2,755,056 | * 7/1956 | Hutton ............................. | 267/293 X |
| 3,762,339 | 10/1973 | Dwyer . | |
| 3,957,318 | 5/1976 | Wiebe . | |
| 4,381,589 | 5/1983 | Cope . | |
| 4,712,487 | 12/1987 | Carlson . | |
| 5,062,654 | * 11/1991 | Kakimoto et al. .................... | 267/141 |
| 5,080,334 | * 1/1992 | Mihara et al. ........................ | 267/276 |
| 5,131,619 | * 7/1992 | Daugherty et al. ........... | 267/141.3 X |
| 5,493,777 | * 2/1996 | Burke ................................. | 29/895.32 |
| 5,540,420 | * 7/1996 | Luzsicza ............................ | 267/141.1 |
| 5,542,900 | * 8/1996 | Burke .............................. | 29/895.32 X |
| 5,722,631 | * 3/1998 | Dorton ........................... | 267/141.4 X |

FOREIGN PATENT DOCUMENTS 987239   3/1965 (GB) .

* cited by examiner

Primary Examiner—Matthew C. Graham
Assistant Examiner—Melanie Talavera
(74) Attorney, Agent, or Firm—Michael M. Gnibus; Randall S. Wayland

(57) ABSTRACT

An elastomeric bearing. The bearing which may be used to support a railway car body includes first and second members and an elastomeric member interposed in a cavity defined between the first and second members. The second member has a recess formed therein which communicates with the cavity. The elastomeric member includes a working section positioned in the cavity and a non-working section integral with the working section and disposed in the recess. The non-working section serves as a sprue location site during the molding process to avoid locating surface defects associated with the sprue in the working section.

11 Claims, 8 Drawing Sheets

ELASTOMERIC BEARING

FIELD OF THE INVENTION

The present invention relates generally to elastomeric bearings and, more particularly, to an elastomeric side bearing for supporting a railway car body relative to a railway car truck bolster.

BACKGROUND OF THE INVENTION

A railway car conventionally includes a car body supported on the center plates of a pair of longitudinally spaced trucks. The conical-shaped wheels of the trucks engage the respective rails of a railway track. The trucks travel a generally sinuous path along the track as the respective wheels continuously seek a centered position on a respective rail. In traveling such a sinuous path, a railway truck tends to hunt, i.e., yaw or oscillate about a vertical axis of the truck. One side frame of a truck tends to move ahead of the other which, in turn, results in the flanges of the wheels striking and rubbing against the rails, first on one side, and then on the other. Such undesirable lateral oscillations may cause excessive wheel and track wear. In addition, unstable truck hunting responses can develop if the frequency of the cyclic motion approaches resonance.

Also, during travel of a railway car, a railway car body may have the tendency to rock, i.e., oscillate about a horizontal (or roll) axis of the railway car body, independent of the truck upon which the railway car body is mounted. As the trucks of a railway car negotiate their sinuous path of travel along a railway track, the car body may move laterally in concert with the cyclic lateral movement of the truck center plates. A loaded or heavy car may tolerate such lateral oscillation. However, an empty or light car body may rock from side to side which movement can become dangerous should the frequency of the rocking approach resonance.

Efforts to control truck hunting and car body rocking include the use of side bearings which are mounted to a truck bolster on opposite sides of the center plate. Conventional side bearings are configured to maintain frictional contact between a truck and a car body. As the truck yaws, an upper portion of a side bearing slides across the underside of the railway car body. The resulting friction produces an opposing torque which acts to prevent yaw motion. For example, see U.S. Pat. No. 4,712,487 to Carlson, U.S. Pat. No. 4,090,750 to Wiebe, and U.S. Pat. No. 3,762,339 to Dwyer.

One type of side bearing employs a tube form mount. Inner and outer concentric, annular members are employed. An annular elastomeric spring member is interposed between the inner and outer members. The elastomeric spring is bonded to the outer surface of the inner member and to the inner surface of the outer member such that the elastomeric spring operates in shear to resist relative axial movement between the inner and outer members. The bearing is mounted between the truck and car body such that relative displacement between the truck and the car body causes a corresponding relative axial displacement between the inner and outer members.

In order to satisfy close tolerances and achieve faster production rates, bearings as just described are preferably formed using a transfer or injection molding process. With reference to FIG. 10, a tube form mount type bearing 100 is shown. The bearing 100 as shown is mounted in a transfer or injection mold 110 by which it has been formed. The mold 110 includes an upper mold portion 102 including a transfer pot 103 which holds a pig of elastomeric material 140. A plurality of gates or sprue passages 104 extend from the bottom of the transfer pot and communicate with the cavity defined between an inner annular member 120 and an outer annular member 130. A lower mold portion 106 seals the lower end of the cavity. An intermediate mold portion 107 supports the outer member 130 in the mold 110. The elastomeric material 140 is fed into the cavity by forcing a piston 108 downwardly as indicated by arrows 108A into the transfer pot 103. The elastomeric material 140 typically follows paths as indicated by the arrows 141.

Notably, the sprue passages 104 are gated into the working section of the elastomeric member 142. One significant problem experienced with formation of a bearing as described using the prior art method described with reference to FIG. 10 is that at the openings 105 where the sprue passages 104 terminate and meet the elastomeric member 142 (commonly referred to as the sprue location sites), the elastomeric member 142 may develop undesirable performance characteristics which degrade the overall performance of the bearing 100. More particularly, the sprue location site may be a point of crack initiation when the finished and cured part is repeatedly flexed in service. When the cured cull pad material in the transfer pot 103 is removed from the elastomeric member 142, a portion of the elastomeric material 140 which has cured within the gate 104 may remain with the elastomeric member 142 as a nub or sprue. Typically, the nub or sprue must be removed. Often, when the nub or sprue is separated from the elastomeric member 142, the removed portion tears down into the working body of the elastomeric member causing deep sprues and stress concentration which may result in a reduced flex life. Also, flow eddies at the sprue location sites may cause improper knit of the elastomeric material which likewise causes a stress concentration and may reduce the member's durability.

With reference to FIG. 11, as an alternative to terminating the sprues in the working body of the elastomeric member, it has been proposed to form a bearing 100A including an elastomeric member 142A having sprue risers 106A. The upper mold portion 102A is formed with transfer pot 103A in the upper portion thereof and plurality of recesses 152A in the lower face thereof so that the sprue passage openings 105A, and thus the sprue location sites, are at the sprue risers 106A and located above the working section of the elastomeric member 142A. The stress concentrations of the sprue location sites are localized in the low stress riser 106A so that their effect on the performance of the working body of the elastomeric member 142 is reduced. While this alternative improves on the method described above, it presents significant new problems. With reference to FIG. 11A, in service, the bearing 100A is axially compressed between a contact plate 52 and a bolster (not shown). In doing so, the contact surface engages the top of the inner member 120A and also the sprue riser 106A. Chafing of the sprue riser or deflection of the sprue riser 106A into the working body of the elastomeric member 142A by the contact surface 52 may induce stress concentrations and initiate cracks in the elastomeric member. Also, the sprue riser may be unacceptably unattractive.

Accordingly, there exists a need for an elastomeric bearing having an elastomeric member formed by transfer or injection molding wherein the sprue location sites do not present stress concentration points in the working body of the elastomeric member. Further, there exists a need for a convenient and cost-effective method for forming such an elastomeric bearing. Thus, it is apparent that it would be advantageous to provide an alternative directed to overcoming one or more of the limitations set forth above.

Accordingly, a suitable alternative is provided including features more fully disclosed hereinafter.

SUMMARY OF THE INVENTION

In view of the above discussion, it is a first aspect in accordance with the present invention to provide an elastomeric bearing, and more particularly, an elastomeric side bearing having an elastomeric member formed by transfer or injection molding wherein the sprue location sites of the elastomeric member do not present stress concentration points in the working body of the elastomeric member. According to a further aspect, the invention provides such an elastomeric side bearing wherein the sprue location sites do not otherwise interfere with the operation or performance of the side bearing. The present invention provides a convenient and cost effective method for forming such a bearing.

According to the present invention, the elastomeric bearing includes a rigid first member having a first surface and a rigid second member having a second surface opposing the first surface. The first surface and the second surface define a mold cavity therebetween. A recess or kerf is formed in the second surface and communicates with the mold cavity. An elastomeric member is interposed between the first and second members and is secured to each of the first surface and the second surface preferably by hot vulcanized bonding. The elastomeric member includes a working section disposed in the mold cavity. The working section operates as a spring in shear to resist relative axial movement of the first and second members. The elastomeric member also has a non-working section integrally formed with the working section and disposed in the recess. A sprue location site is defined at the non-working section.

Preferably, the bearing includes a plurality of recesses formed in the second surface and spaced apart from one another, and the second member includes an end face adjoining the second surface along a corner, the recess or recesses being formed in the corner. In such a case, the non-working section of the elastomeric member preferably does not extend outwardly from the first member beyond the second surface or the end face. According to a preferred embodiment, the first member is an outer member and the second member is an inner member.

The present invention is further directed to an advantageous transfer or injection molding method for forming an elastomeric bearing such as a side bearing. The method includes providing a first member having a first surface and a second member having a second surface opposing the first surface. The first surface and the second surface define a mold cavity therebetween. A recess is formed in the second surface and communicates with the mold cavity. A transfer mold member is provided having a gate passage defined herein, the gate passage having a gate opening. The mold member is positioned such that the gate opening is disposed adjacent the recess. A supply of elastomeric material is fed through the gate passage, through the gate opening and into the recess to fill the mold cavity.

The first and second members provided according to the method are preferably constructed as described above. Preferably, the mold cavity is configured to form an elastomeric member having a working section and a non-working section, the non-working working section being disposed in the recess following the step of feeding the elastomeric material. According to a preferred embodiment, the first member is an inner member and the second member is an outer member. The outer member may include a substantially rigid outer casing of the formed bearing.

The side bearing and method of the present invention overcome the shortcomings of the aforedescribed methods. More particularly, the sprue location sites are positioned at the non-working sections where they do not adversely affect the performance of the bearing. In this manner, manufacture of the bearing is facilitated and the performance of the bearing is enhanced by locating defects associated with the mold gates outside of the working body of the elastomeric member.

The foregoing and other aspects will become apparent from the following detailed description of the invention when considered in conjunction with the accompanying drawing figures.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
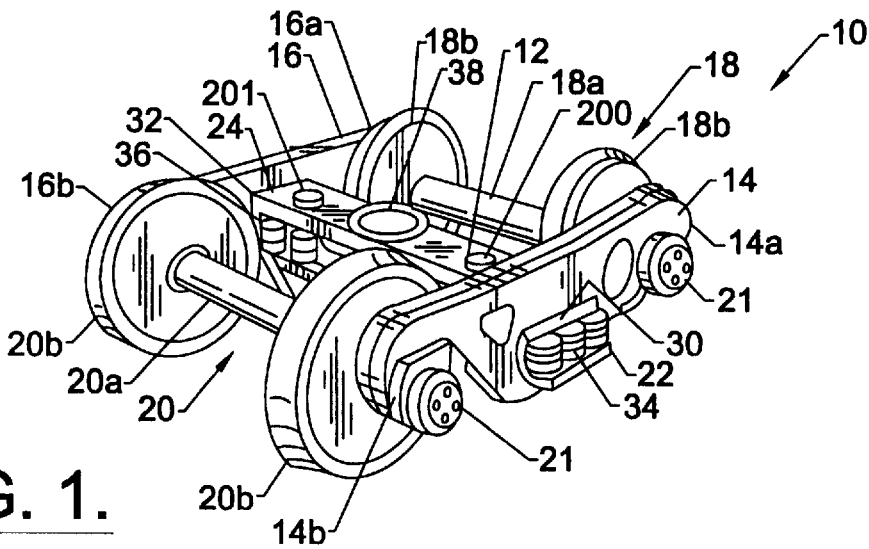
FIG. 1 is a perspective view of a conventional railway car truck.

Referring now to FIG. 1, a railway car truck 10 including side bearings according to an embodiment of the present invention is illustrated. The illustrated truck 10 includes a bolster 12 extending between opposing side frames 14, 16.

The ends 14A, 14B, 16A, 16B of each respective side frame 14, 16 are connected to respective wheelsets 18, 20. Each wheelset 18, 20 includes a respective axle 18A, 20A with two wheels 18B, 20B mounted thereto, as illustrated. Bearings 21 are connected to the journal ends of the respective axles 18A, 20A outside of the wheels 18B, 20B, as illustrated. The opposing ends 22, 24 of the bolster 12 are received in respective window openings 30, 32 of the side frames 14, 16. The side frames 14, 16 support the bolster 12 through respective spring assemblies 34, 36 which are configured to reduce dynamic forces produced as the truck 10 travels along a track, thereby providing a smooth ride.

As is known to those skilled in the art, a railway car body is connected to a centerplate 38 of the bolster 12 via a kingpin which allows the car body to pivot on the truck 10 as the truck travels along a curved section of track. A pair of side bearings 200, 201, according to the present invention are provided on respective sides of the centerplate 38, as illustrated. Each side bearing 200, 201 is securely mounted to the bolster 12 and maintains constant frictional contact with a railway car body, typically via wear plates mounted to the underside of the railway car body. The frictional contact, however, is not of sufficient magnitude to prevent relative movement between the car body and the truck bolster 12.

Figure 2:
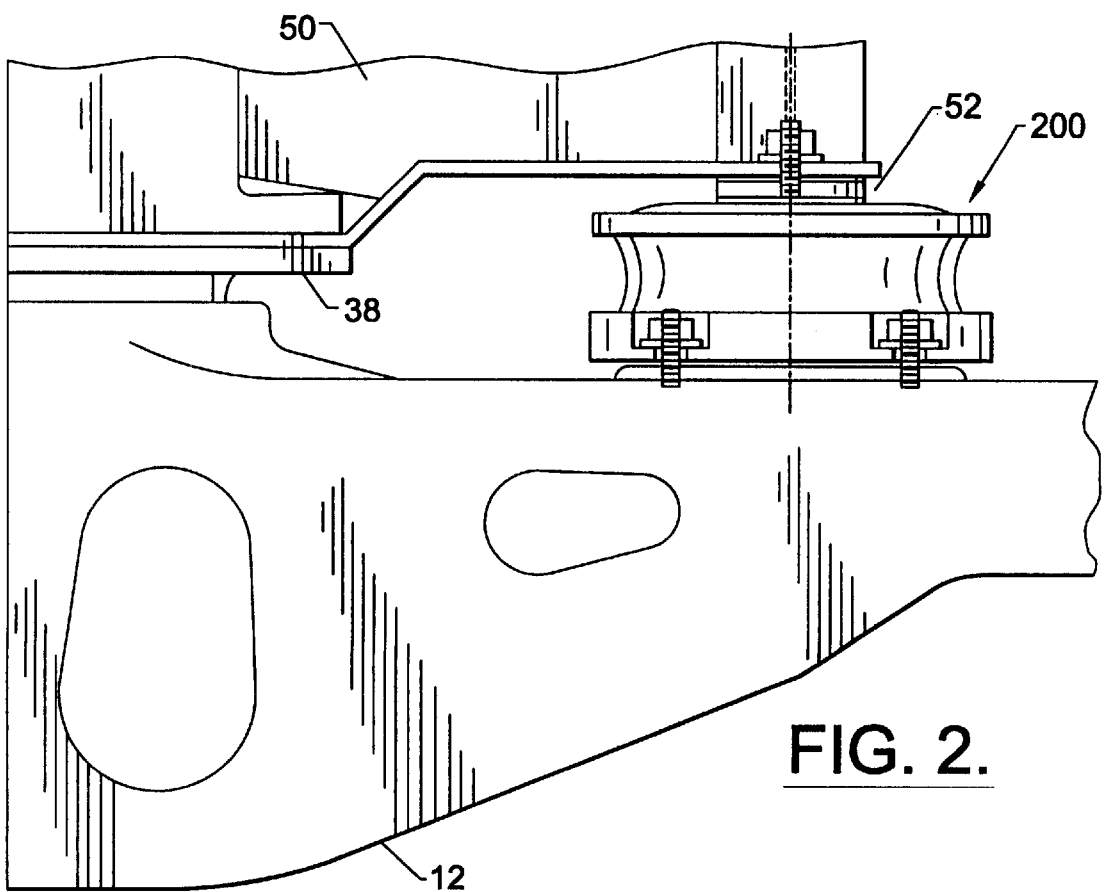
FIG. 2 is an enlarged, partial, forward-looking, elevational view of the railway car assembly having a side bearing assembly according an embodiment of the present invention disposed between the car body and truck bolster.

Referring now to FIG. 2, a partial frontal elevational view of a truck bolster 12 having a side bearing 200 mounted thereto, according to the present invention, is illustrated. A car frame 50 and body (not shown) supported by the bolster 12 via the centerplate 38 and side bearings 200, 201 are positioned on opposite sides of the centerplate 38. It is noted that only the side bearing 200 is illustrated in FIG. 2. A wear plate 52 is connected to the car frame 50, as illustrated, for frictional engagement with the top (or upper) portion of the side bearing 200. The side bearing 200 is mounted to the bolster 12 via suitable mounting means, for example, a plurality of bolts or studs with nuts.

Figure 3:
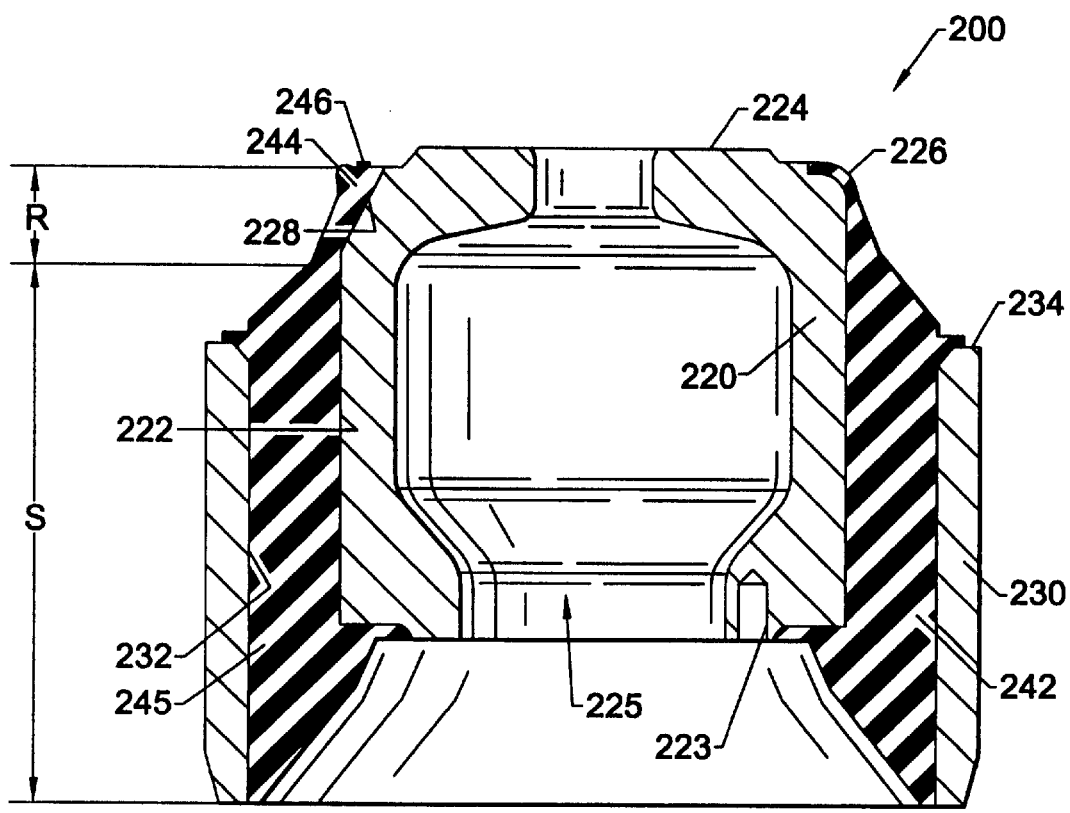
FIG. 3 is a cross-sectional side view of the side bearing of FIG. 2 taken along the line 3—3 of FIG. 4.
Figure 4:
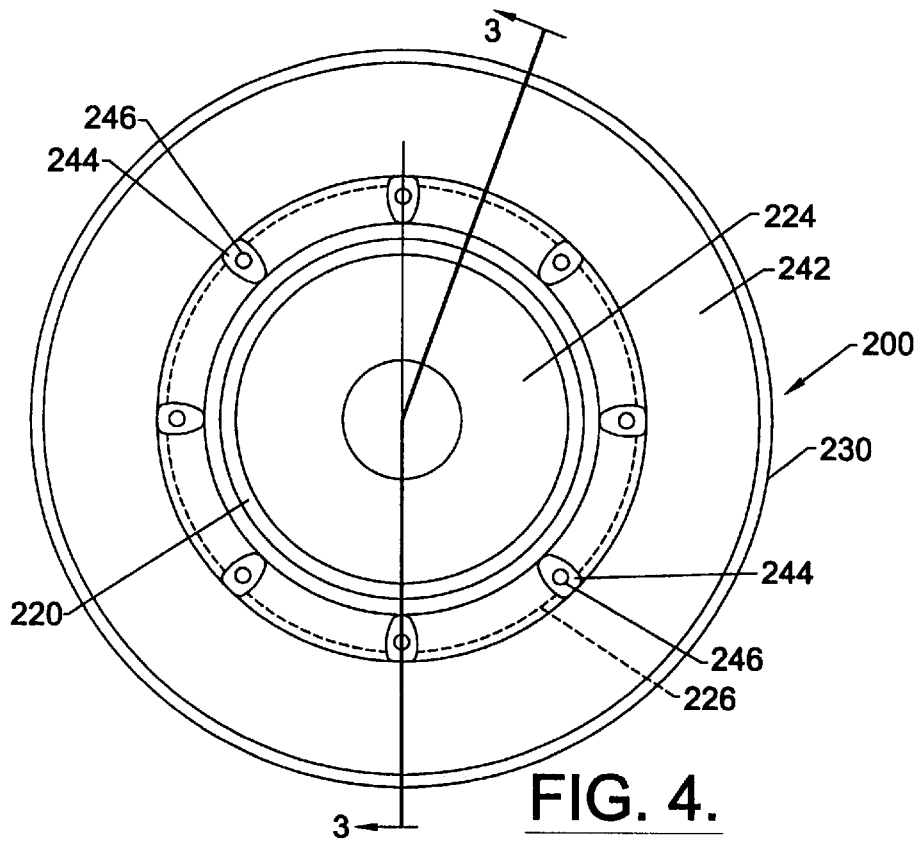
FIG. 4 is a top plan view of the side bearing of FIG. 3.
Figure 5:
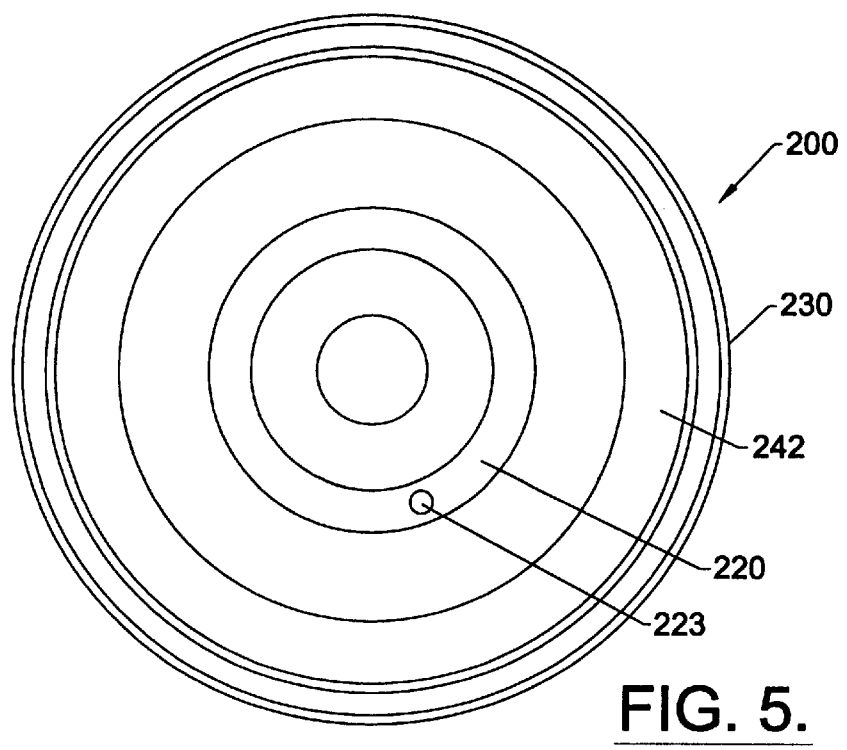
FIG. 5 is a bottom plan view of the side bearing of FIG. 3.

With reference to FIGS. 3–5, the side bearing 200 according to the present invention is shown in greater detail. The side bearing 200 includes an inner annular member 220 and a concentric outer annular member 230. The inner and outer members 220, 230 are rigid and preferably formed of metal, such as steel. The inner member 220 includes a cavity 225 formed therein. An annular elastomeric member 242 is disposed between the inner member 220 and the outer member 230 and is bonded to each of the outer surface 222 of the inner member 220 and the inner surface 232 of the outer member 230.

The elastomeric member 242 is preferably formed of a natural or synthetic rubber or a blend thereof. The elastomeric member 242 preferably is of a hardness of between about 40 and 65 Durometer Shore A. However, any other suitable hardness may be utilized.

The elastomeric member 242 includes a working body section 245 extending about its circumference and extending axially through dimension S (see FIG. 3). By "working body section" it is meant that this portion of the elastomeric member 242 serves as a spring, which in this case is operating in shear, which resists relative axial movement between the inner member 220 and the outer member 230.

The bearing 200 is characterized in that the inner member 220 has kerfs or recesses 228 formed therein about its upper edge 226 and the elastomeric member 242 includes non-working sections 244 disposed in the recesses 228. The recesses 228 and the non-working sections 244 are spaced apart about the circumference of the bearing 200 (see FIG. 4). The non-working sections 244 extend axially through dimension R. By "non-working section" it is meant that these portions of the elastomeric member 242 provide substantially no or only de minimis resistance to relative axial movement between the inner and outer members 220, 230 through their intended range of relative motion. As shown, there are eight (8) of the non-working sections, however, more or fewer may be provided. Sprues or nubs 246 of elastomeric material project from the non-working sections 244 and may optionally be removed. As will be appreciated by the skilled artisan upon review of FIGS. 3–5, the non-working sections 244 will be substantially free of shear stress when the inner member 220 and the outer member 230 are axially displaced relative to each other at least as far as axially aligning their respective upper faces 224, 234. Accordingly, the non-working sections 244 do not adversely affect the performance of the bearing 200. To the contrary, the non-working sections 244 facilitate the manufacture of the bearing 200 and, in fact, enhance the performance of the bearing by locating defects associated with the transfer mold gates outside of the working body section 245, as discussed in more detail below.

Figure 6:
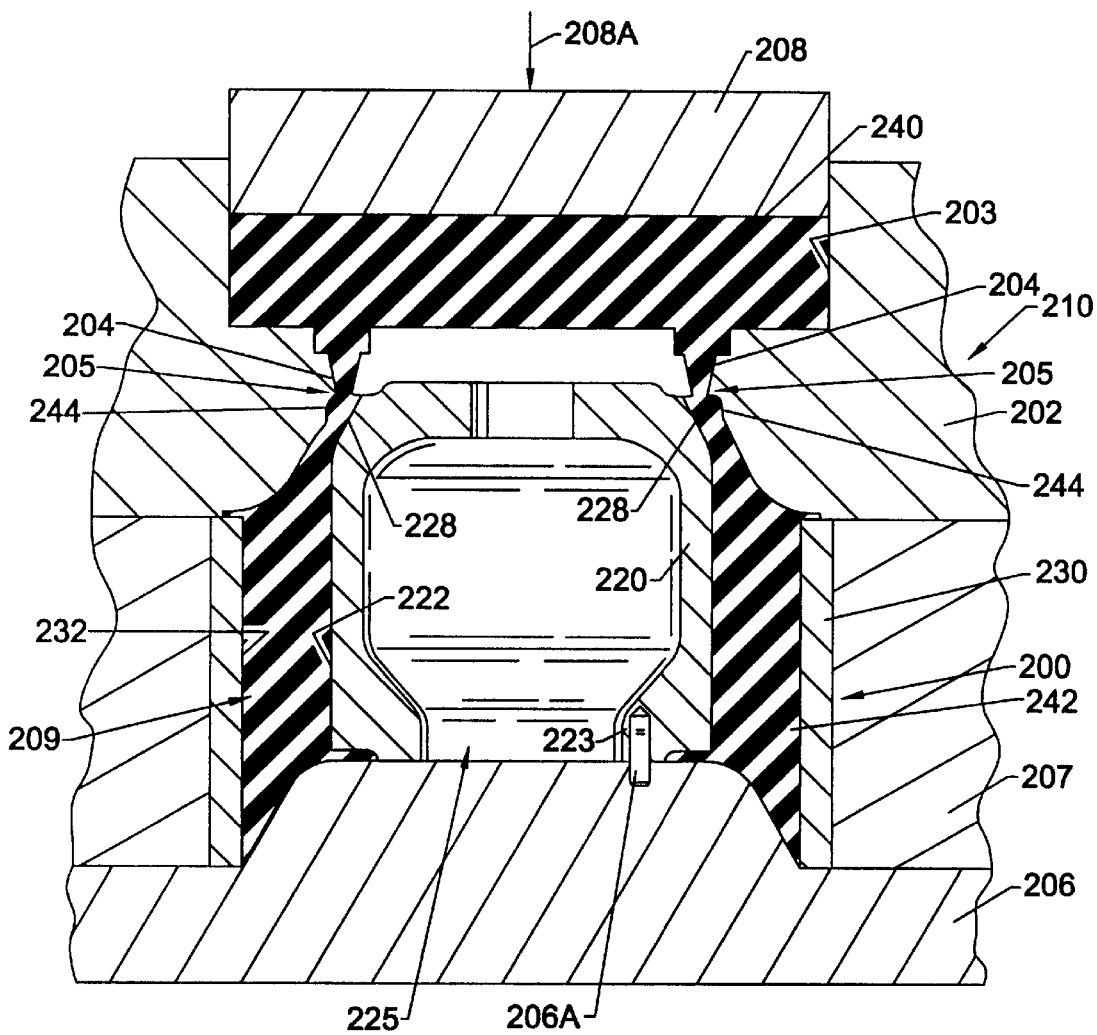
FIG. 6 is a cross-sectional side view of the side bearing of FIG. 3 mounted in a mold.

The bearing 200 may be formed by the following method according to the present invention. With reference FIG. 6, the bearing 200 is shown mounted in a mold 210. Initially, the inner member 220 and the outer member 230 are mounted relative to mold pieces 206, 207 as shown. A pin 206A of the base mold piece 206 and a hole 223 (FIGS. 3, 5) formed in the inner member 220 serve to positively orient the inner member 220 and the base mold piece 206 with respect to one another. Positive alignment may be achieved by other means as well, for example, the lower opening of the cavity 225 may be hex-shaped, octogaon shaped, or include a key with a mating piece being formed on the mold base piece 206. The shape of the base piece 206 defines the shape of the lower face of the elastomeric member 242 once formed.

Figure 7:
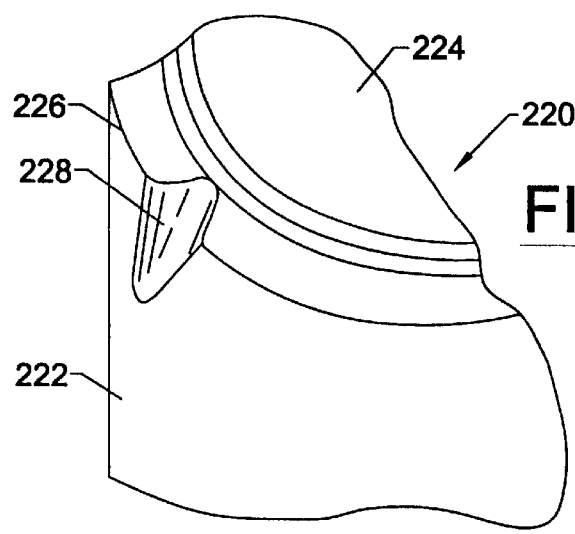
FIG. 7 is an enlarged, perspective, partial view of an inner member forming part of the side bearing of FIG. 3.
Figure 8:
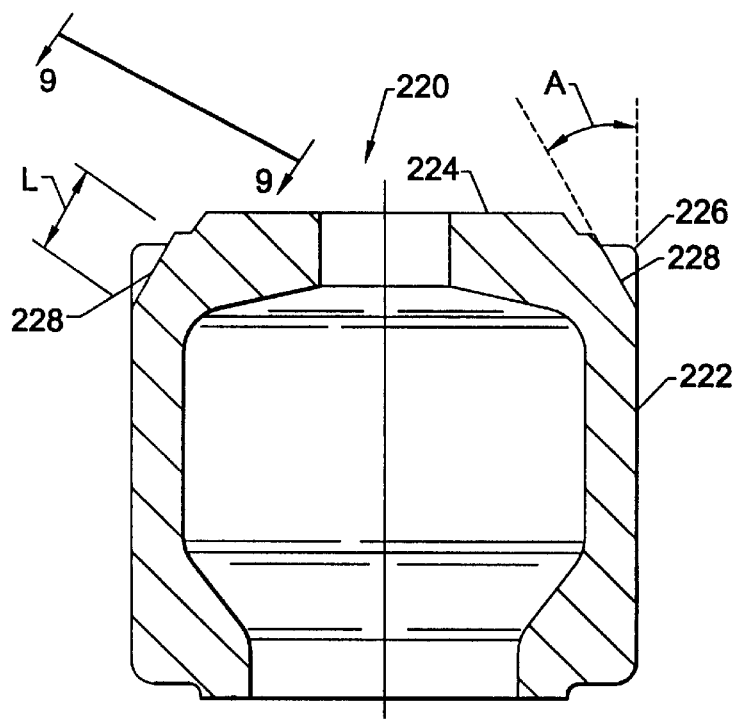
FIG. 8 is a cross-sectional side view of the inner member of FIG. 7.
Figure 9:
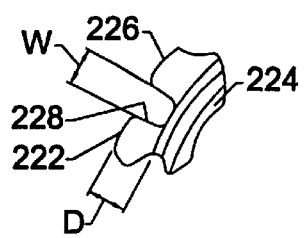
FIG. 9 is a partial, elevational view taken along the line 9—9 of FIG. 8.
Figure 10:
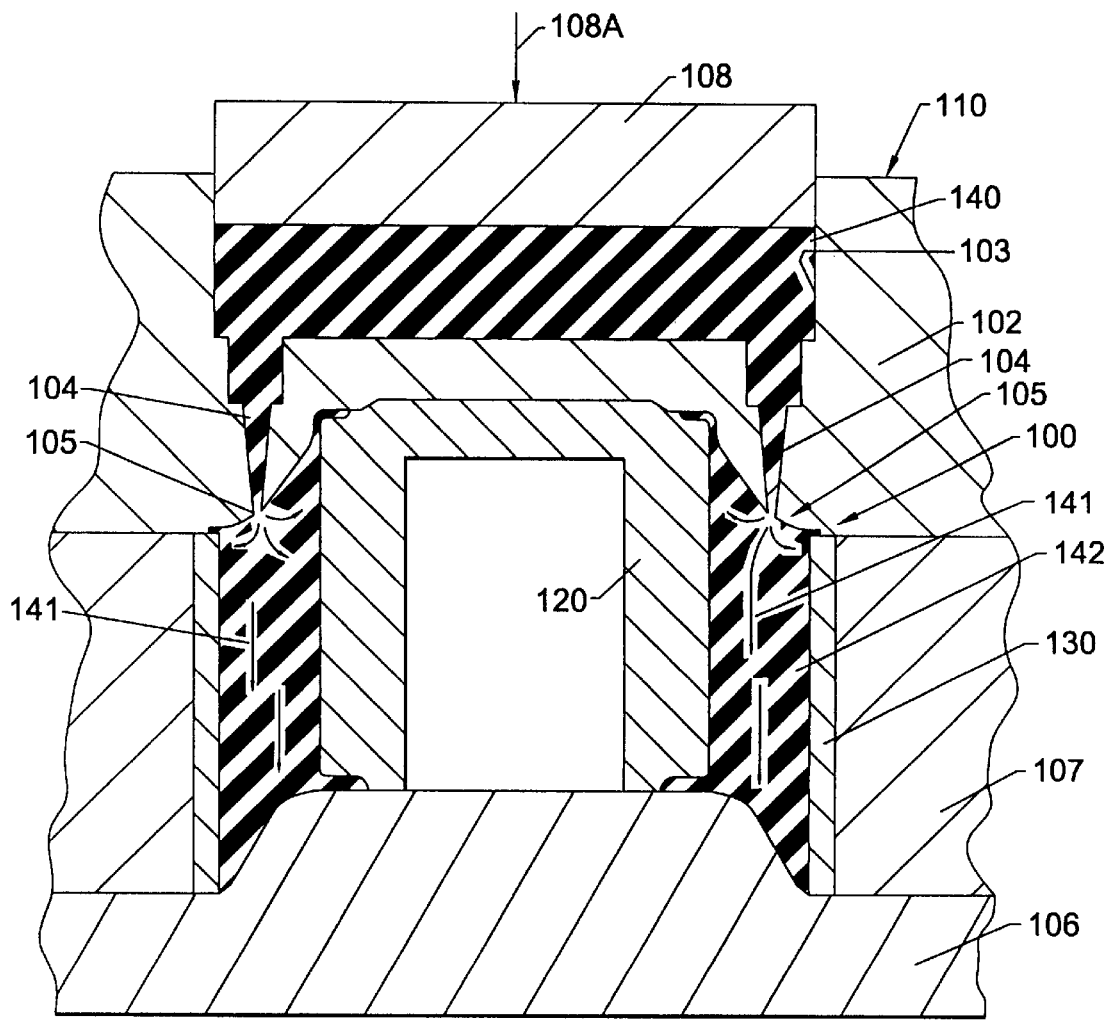
FIG. 10 is a cross-sectional side view of a bearing mounted in a mold for forming the same according to the prior art.
Figure 11:
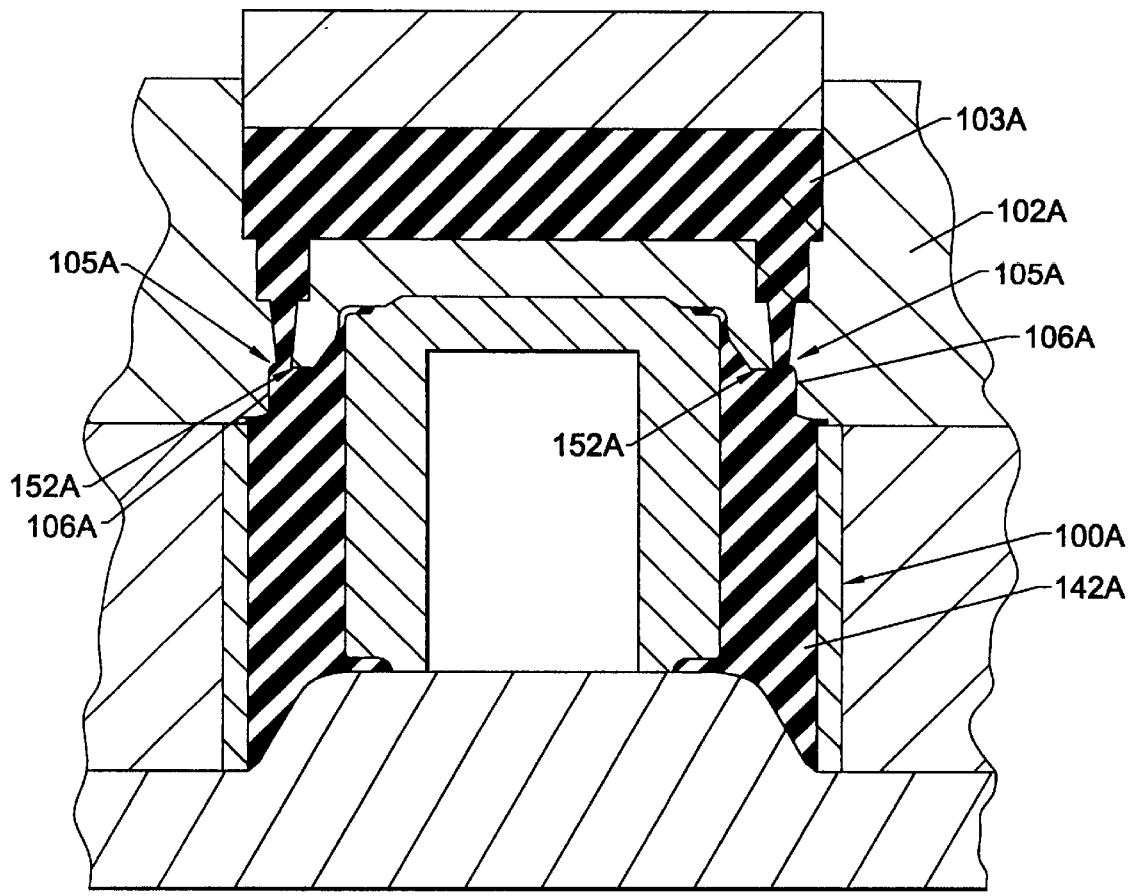
FIG. 11 is a cross-sectional side view of another bearing mounted in a mold for forming the same according to the prior art.
Figure 11A:
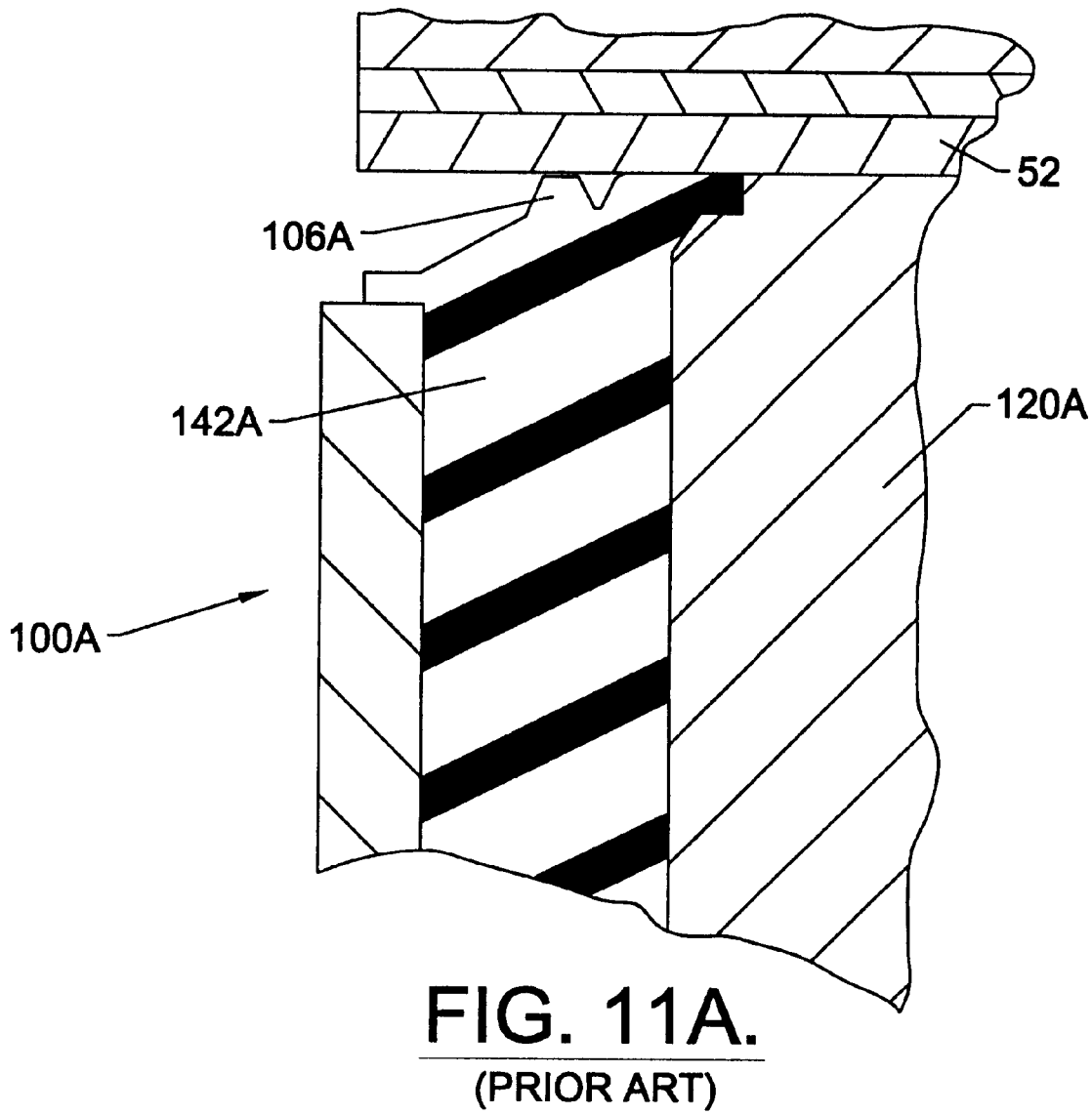
FIG. 11A is an enlarged, partial, cross-sectional side view of the bearing of FIG. 11 axially compressed between a contact plate and a bolster (not shown).

With reference to FIGS. 7–9, the inner member 220 has formed therein a plurality of circumferentially spaced apart recesses or kerfs 228. The inner member 220 has an upper face 224 which joins the outer surface 222 along a circumferential extending corner 226. The corner 226 is preferably continuously uniform except at the locations of the kerfs 228. The inner member 220, including the kerfs 228, is preferably formed by casting. Alternatively, the recesses 228, as well as the inner member 220, may be formed by machining.

Preferably, the recesses 228 are smoothly rounded as shown in FIG. 9. The recesses 228 are preferably spaced apart between about 30 degrees and 60 degrees about the circumference of the inner member 220. Preferably also, each recess 228 has a length L in the range of between about 0.25 inch (6.3 mm) and 0.75 inch (19.0 mm) (FIG. 8). The width W (FIG. 9) of each recess 228 is preferably between about 0.12 inch (3.05 mm) and 0.5 inch (12.7 mm). The depth D (FIG. 9) of each recess 228 is preferably between about 0.25 inch (6.3 mm) and 0.75 inch (19 mm). Preferably, each recess 228 forms an angle A (FIG. 8) with respect to the outer surface 222 of between about 15 degrees and 45 degrees.

Again referring to FIG. 6, the upper mold portion 202 includes a plurality of sprue passages or gate passages 204 having spacing and locations corresponding to the spacing and locations of the plurality of recesses 228. The upper mold portion 202 is placed over the inner member 220 and the outer member 230 as shown. More particularly, the upper mold portion 202 is placed such that gate openings 205 of the respective gate passages 204 are positioned at each recess 228 as shown. To ensure proper alignment, the mold 210 is configured such that the upper mold portion 202 and the base mold piece 206 are positively oriented with respect to one another via the intermediate mold piece 207 and appropriate locator pins (not shown) or other suitable locator mechanisms. The inner member is oriented with respect to the base mold piece 206 by the hole 223 and pin 206A. Accordingly, positive alignment between the inner member 220 and the upper mold portion 202, and thereby the recesses 228 and the gate openings 204, is ensured.

The transfer pot 203 of the upper mold portion 202 is filled with a pig of uncured elastomeric material 240. A piston 208 is driven in the direction indicated by the arrows 208A. The elastomeric material 240 under heat and pressure is thereby forced through the gate passages 204. The elastomeric material 240 enters the mold cavity 209 at the gate openings 205, enters the respective recesses 228, flows into the cavity 209 and fills the cavity. The recesses 228 are also filled with elastomeric material 240 forming the sprue risers 244. Notably, the gate openings 205 are located such that the effective sprue risers are positioned at or within the recesses 228 and therefore within the envelope of the inner member 220 and entirely within the non-working section.

The elastomeric material is vulcanized bonded via suitable beat and pressure to the outer surface 222 of the inner member and to the inner surface 232 of the outer member. Once the elastomeric material has sufficiently cured, the cull pad of cured elastomer 240 and the upper mold piece 202 are removed thus breaking the sprues at the sprue openings 205. If desired, the portions of sprues 246 (see FIG. 4) which remain following removal of the upper mold portion 202 may be removed. Finally, the outer member 230 is swaged (radially and plastically compressed) to statically pre-load the elastomeric member 242.

As discussed above, by the provision of recesses 228, the imperfections associated with the sprue location sites (i.e., where the gate openings 205 meet the elastomeric member 242) are substantially isolated from the working body section 245 (FIG. 3). If the sprues 246 remain, deflection thereof by a contact plate or the like will not present a problem. If the sprues 246 are removed, either during removal of the transfer pot 202 or as a separate step thereafter, and the removed portion tears into the non-working body section 244, the effective performance of the bearing 200 will not be significantly degraded. Moreover, poor knit of the elastomeric material in the non-working sections 244 will not significantly adversely affect the performance of the elastomeric member 242. Additionally, the non-working sections 244 of the elastomeric member 242 are not unattractive or obtrusive.

It will be appreciated that mold configurations other than those shown herein may be employed. Further, it will be appreciated that different constructions and arrangements of the inner member 220 and the outer member 230 may be used. Recesses may be formed in the outer member 230 in addition to or in place of the recesses 228 in the inner member 220. In such case, the transfer pot would be provided with corresponding gate passages and openings and the formed bearing would have non-working elastomeric sections in these recesses.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An elastomeric bearing, comprising:
 a) a rigid first member having a first surface;
 b) a rigid second member having a second surface, said first surface and said second surface defining a mold cavity therebetween, a plurality of recesses spaced apart from one another being formed in said second surface and communicating with said mold cavity; and
 c) an elastomeric member interposed between said first and second members, said elastomeric member secured to each of said first surface and said second surface and including:
  i) a working section disposed in said mold cavity, said working section operating as a spring to resist relative movement of said first and second members;
  ii) a non-working section integrally formed with said working section and disposed in said recess; and
  iii) a sprue location site defined at said non-working section.

2. The elastomeric bearing of claim 1 wherein said second member includes an end face adjoining said second surface along a corner, said recess being formed in said corner.

3. The elastomeric bearing of claim 2 wherein said non-working section of said elastomeric member does not extend outwardly from said second member beyond either of said second surface and said end face.

4. The elastomeric bearing of claim 2 including a plurality of said recesses formed in said corner and spaced apart from one another, a respective said non-working section being disposed in each said recess.

5. The elastomeric bearing of claim 1 wherein said first member is an outer member, said first surface is an inner surface thereof, said second member is an inner member and said second surface is an outer surface thereof.

6. The elastomeric bearing of claim 1 wherein said elastomeric member is preloaded in compression.

7. The elastomeric bearing of claim 1 wherein said elastomeric member has a Shore A hardness of between about 40 and 65.

8. An elastomer bearing, comprising:
 a) a rigid outer member having an inner surface;
 b) a rigid inner member having an outer surface and an end face adjoining said outer surface along a corner, said inner surface and said outer surface defining a mold cavity therebetween, a plurality of spaced apart recesses being formed in said corner and communicating with said mold cavity; and
 c) an elastomeric member interposed between said inner and outer members, said elastomeric member secured to each of said inner surface and said outer surface and including:

ii) a working section disposed in said mold cavity, said working section operating as a spring in shear to resist relative axial movement of said inner and outer members;

ii) a plurality of non-working sections integrally formed with said working section and each disposed in a respective said recess, each said non-working section not extending outwardly from said inner member beyond either of said outer surface and said end face; and iii) a sprue location site defined at said non-working section.

9. The elastomeric bearing of claim 8 wherein said elastomeric member is preloaded in compression.

10. The elastomeric bearing of claim 8 wherein said elastomeric member has a shore a hardness of between about 40 and 65.

11. An elastomeric bearing, comprising:

a) a rigid first member having a first surface;

b) a rigid second member having a second surface, said first surface and said second surface defining a mold cavity therebetween, at least one recess being formed in said second surface and communicating with said mold cavity; and c) an elastomeric member interposed between said first and second members, said elastomeric member secured to each of said first surface and said second surface and including:

i) a working section disposed in said mold cavity, said working section operating as a spring to resist relative movement of said first and second members;

ii) a non-working section integrally formed with said working section and disposed in said recess; and iii) a sprue location site defined at said non-working section.

* * * * *